(No Model.)
C. R. BANNIHR.
LUGGAGE CARRIER FOR BICYCLES.
No. 363,355. Patented May 24, 1887.
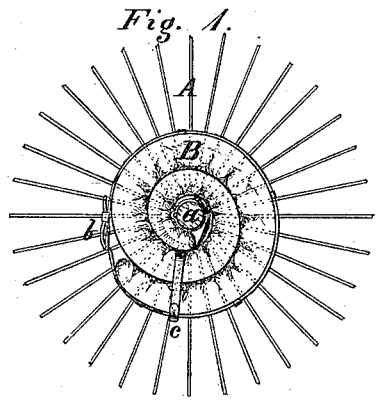
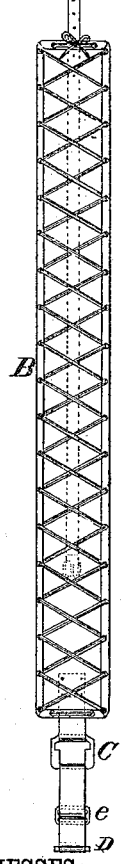
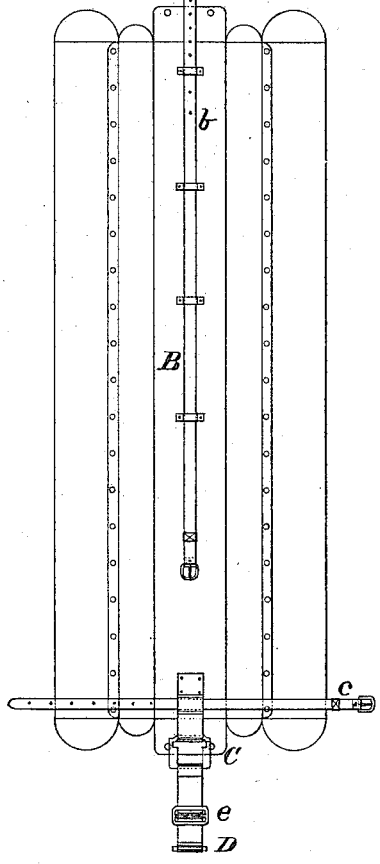
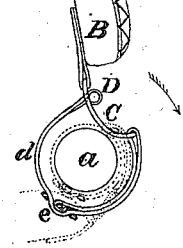
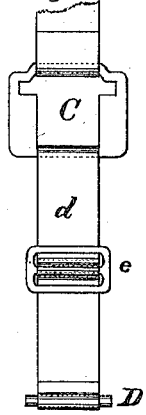
WITNESSES:
Wesley Jeralds
Fred Willetts
INVENTOR
Caesar R. Bannihr

UNITED STATES PATENT OFFICE.

CÆSAR R. BANNIHR, OF WEST CHESHIRE, CONNECTICUT.

LUGGAGE-CARRIER FOR BICYCLES.

SPECIFICATION forming part of Letters Patent No. 363,355, dated May 24, 1887.

Application filed August 16, 1886. Serial No. 210,989. (No model.)

*To all whom it may concern:*

Be it known that I, CÆSAR R. BANNIHR, a citizen of the United States, residing at West Cheshire, in the county of New Haven and State of Connecticut, have invented a new and useful Improvement in Luggage-Carriers, for the purpose of carrying luggage when traveling with a bicycle or tricycle, to which vehicles the invention is mainly adapted, but it may also serve in place of a valise in the different purposes to which it is put; and I do hereby declare that the following is a full, clear, and exact description thereof, reference being had to the accompanying drawings.

The object of my invention is to supply such vehicles as bicycles or tricycles with a luggage-carrier that will be sufficiently large to hold such articles as are necessary for one to carry when traveling, and at the same time to be of a material and form that can be easily attached to and carried on a bicycle or tricycle without interfering with any part of the vehicle or its rider, and yet to have all the qualities of any ordinary traveling-bag when it is removed from the vehicle. I attain this object as shown by the accompanying illustrations, of which—

Figure 1 is a side view of the invention as applied to the shaft of a bicycle-wheel. Fig. 2 is an outside or back view of the same when empty and removed from the wheel. Fig. 3 shows the same when filled and closed ready to apply to any suitable part of such vehicle, as mentioned above. Fig. 4 shows that part of the invention by which it is secured to the vehicle on which it is to be carried, as when it is used on a bicycle it is best applied to the shaft on the inside of the wheel. Fig. 5 shows a face view of the same when removed from the shaft of said wheel.

Similar letters refer to similar parts throughout the several views, of which—

A is a section of a bicycle-wheel. $a$ is the shaft of the same, to which is applied the luggage-carrier B by means of the noose shown on an enlarged scale in Figs. 4 and 5. The bundle or luggage-carrier is then wound tightly around the shaft and secured with the strap $b$, which is supplied with the ordinary buckle, thus making a neat and compact bundle.

The luggage-carrier is made out of rubber-coated cloth or oiled silk, or any suitable material, and is stiffened of the required width and the entire length, (but not sufficiently to mar its elasticity,) for the purpose of keeping the roll in shape when the strap C is applied to the side on its radius.

The device for securing the inside end of the bundle is composed of a band, $d$, having a slide, $e$, by which it may be lengthened or shortened in the ordinary way common to bands or belts requiring to be changed in length. To the band is attached a loop, C, having a T-shaped hole through it and being curved, as shown in Fig. 4. This end of the band is attached to the luggage-carrier, and a bar, D, is attached to the other end, which is put through the loop C in the direction indicated by the arrow. When the loop is drawn down, or in the direction of the arrow, it will draw the band tight around whatever it may be placed, as to the shaft of a bicycle, as shown by the dotted line in Fig. 4. This will then allow the bundle to be wound tight around the shaft or any other part of the above-described vehicles, if desired. When the luggage-carrier is filled, the laps on each side are brought together, one over the other, and having a rib with eyelet-holes in along the edge, and also in the end laps, through which a lace is passed and crossed from side to side, and secured on the end, as shown in Fig. 3. Instead of this means any other of the well-known ways may be used without any material change.

Having fully described my invention, what I claim as new, and desire to secure by Letters Patent, is—

1. As an article of manufacture, a luggage-carrier for bicycles or tricycles, made of a flexible material and in a parallelogrammic form, having a springy outer side as a means for maintaining shape and securing rigidity to the luggage-carrier when attached to and coiled around the shaft $a$, as herein shown and described.

2. The combination, in a luggage-carrier for bicycles or tricycles, of a thin flexible material with a stiff or springy material, in which the thin flexible material forms that part which tends toward the inside of the coil around the shaft $a$, and in which the springy or stiffer material forms the back or outside of the coil, for the purpose of giving form and rigidity to the luggage-carrier when applied to the shaft $a$, substantially as and for the purpose specified.

3. In a luggage-carrier for the purpose described, the combination of the band $d$, loop C, bar D, and slide $e$, forming a noose, by which means the luggage-carrier is secured to the shaft of a bicycle or similar vehicle, as herein fully set forth and described.

CÆSAR R. BANNIHR.

Witnesses:
 WESLEY JERALDS,
 FRED WILLETTS.